United States Patent
Shinngai et al.

(10) Patent No.: US 7,760,615 B2
(45) Date of Patent: Jul. 20, 2010

(54) REWRITABLE PHASE-CHANGE OPTICAL RECORDING MEDIUM

(75) Inventors: Hiroshi Shinngai, Tokyo (JP); Hideki Hirata, Tokyo (JP); Tatsuya Kato, Tokyo (JP); Hiroshi Takasaki, Tokyo (JP); Yasuhiro Takagi, Tokyo (JP); Masaki Sobu, Tokyo (JP); Masanori Kosuda, Tokyo (JP)

(73) Assignee: TDK Corporation, Tokyo (JP)

( * ) Notice: Subject to any disclaimer, the term of this patent is extended or adjusted under 35 U.S.C. 154(b) by 89 days.

(21) Appl. No.: 12/155,972

(22) Filed: Jun. 12, 2008

(65) Prior Publication Data
US 2008/0310279 A1    Dec. 18, 2008

(30) Foreign Application Priority Data
Jun. 15, 2007  (JP)  ............................. 2007-158821
Apr. 23, 2008  (JP)  ............................. 2008-113208

(51) Int. Cl.
*G11B 7/24*    (2006.01)
(52) U.S. Cl. .............. 369/275.2; 369/275.4; 430/270.13
(58) Field of Classification Search .............. 369/275.2, 369/275.1, 275.4; 430/270.13
See application file for complete search history.

(56) References Cited

U.S. PATENT DOCUMENTS

| 6,922,386 B2 * | 7/2005 | Shintani et al. | 369/275.2 |
| 2006/0040088 A1 * | 2/2006 | Hirotsune et al. | 428/64.4 |
| 2008/0239934 A1 * | 10/2008 | Shingai et al. | 369/275.2 |

FOREIGN PATENT DOCUMENTS

| JP | A-2004-306595 | 11/2004 |
| JP | A-2006-315242 | 11/2006 |

* cited by examiner

*Primary Examiner*—Tan X Dinh
(74) *Attorney, Agent, or Firm*—Oliff & Berridge, PLC

(57) ABSTRACT

A rewritable phase-change optical recording medium is provided, which includes a substrate, a first information layer, a spacer layer, a second information layer, and a cover layer. The second information layer includes a recording film containing Sb as a main component and V or V and In as second components. When an amorphous mark formed in the recording film is irradiated with a reproduction beam, crystallization of the amorphous mark occurs only in a central portion in the width direction of the amorphous mark. The width direction is orthogonal to the scanning direction of the laser beam. The recording film is formed of a material that exhibits a change in degree of modulation of 5% or less when recorded information is repeatedly reproduced. The change in degree of modulation is a change from when the number of times of reproduction is 100,000 to when it is 400,000.

18 Claims, 9 Drawing Sheets

US 7,760,615 B2

REWRITABLE PHASE-CHANGE OPTICAL RECORDING MEDIUM

BACKGROUND OF THE INVENTION

1. Field of the Invention

The present invention relates to an optical recording medium referred to as a next generation DVD (digital versatile disc) and, in particular, to a rewritable phase-change optical recording medium having two or more information layers formed of a phase change material.

2. Description of the Related Art

Blu-ray (trademark) discs (hereinafter abbreviated as BDs), for example, have been proposed as next generation DVDs. For BDs, an optical system is used which includes a recording-reproduction laser of a wavelength of 405 nm (blue) and an objective lens having a numerical aperture NA of 0.85 ($\lambda/NA \leq 500$ nm).

In optical disc drives for BDs or other discs, a single-mode oscillation diode laser is used, and high frequency modulation is applied to a reproduction laser beam at a frequency of several hundred MHz in order to reduce laser noise generated during signal reproduction. Generally, the high frequency modulation is performed under the conditions of a frequency of 300 to 500 MHz, a Ratio of 3 to 8, and a pulse width of 200 to 400 psec. Here, the "Ratio" is the ratio of the peak value of the laser power to the average value.

For BDs, rewritable optical recording media have been proposed which have two or more information layers on one side. In such multi-layer optical recording media, information layers other than an information layer (L0 layer) located farthest away from a laser beam incident surface must be semi-transparent information layers that are semi-transparent to the wavelength of a recording-reproduction laser beam, in order to allow the laser beam directed to the L0 layer to pass therethrough. For example, in dual-layer optical recording media, an L1 layer located on the light incident side of the L0 layer is a semi-transparent information layer. Therefore, the reflectivity from the L1 layer becomes low, and the reflectivity from the L0 layer also becomes low because the laser beam is incident on and reflected from the L0 layer through the L1 layer. In such dual-layer optical recording media, the reflectivity is lower than that of single-layer optical recording media. Accordingly, the power of the laser beam during reproduction (the reproduction power) must be increased to ensure a sufficient amount of light returning to a pickup.

Moreover, the laser beam used for BDs has a shorter wavelength than that used for DVDs, and an objective lens having a high NA is used in the BDs, whereby a spot size is reduced. Therefore, the energy density at the laser spot is very high.

Furthermore, as described above, since the L1 layer in the dual-layer optical recording media must be a semi-transparent information layer, the thickness of a metal reflection film must be reduced. Therefore, the heat generated by the laser beam irradiated onto the recording film of the L1 layer is not sufficiently dissipated from the reflection film, so that the cooling rate in the L1 layer is lower than that in the L0 layer, i.e., the L1 layer has a slow-cooling structure.

Moreover, when the linear velocity for recording is increased to perform high-speed recording, i.e., when the rotation speed of the disc is increased, the pickup cannot easily follow grooves on the disc, and therefore servo control is not stabilized. Hence, when high-speed recording is performed, the reproduction power must be increased to stabilize the servo control.

Therefore, in the semi-transparent information layers in next generation DVDs having two or more information layers, the reproduction beam causes deterioration of recorded signals, so that the reproduction durability is reduced significantly. This problem is caused by the following four main reasons: high reproduction power, high energy density of the laser spot, the slow-cooling structure in the semi-transparent information layers, and high-speed recording.

As described above, high frequency modulation is applied to the reproduction beam. Therefore, the higher the Ratio in the high frequency modulation, the higher the peak power of the reproduction beam, so that the temperature of the recording film in the portion irradiated with the reproduction beam increases significantly. Therefore, since a high-power reproduction beam under high frequency modulation at high Ratio is used in BDs, it is more difficult to achieve sufficient reproduction durability in the BDs than in DVDs.

In particular, in rewritable phase-change optical recording media, amorphous marks serving as recorded signals can be crystallized when irradiated with a laser beam having a high-reproduction power. In such a case, the recorded signals are likely to be lost, and durability of reproduction is significant.

In order to solve the above problems, Japanese Patent Application Laid-Open No. 2004-306595 discloses information recording media in which an Sb—Ge—In based alloy is used as the phase-change recording material, and Japanese Patent Application Laid-Open No. 2006-315242 discloses phase-change optical information recording media in which an Sb—Te based alloy is used as the phase-change recording material.

SUMMARY OF THE INVENTION

In view of the foregoing problems, various exemplary embodiments of this invention provide a rewritable phase-change optical recording medium, such as a next generation DVD, which suffers less durability of reproduction even when a multi-layer structure is employed and/or the recording speed is increased, and therefore has high reproduction durability.

The present inventors have made intensive studies and have consequently found that it is difficult to simultaneously achieve both good reproduction stability at a high reproduction power and good recording characteristics (high-speed rewriting characteristics) during high-speed rewriting at 4× speed or higher in the recording media disclosed in the above patent documents. For example, the Japanese Patent Application Laid-Open No. 2006-315242 describes that a phase-change optical recording medium having excellent storage stability, reproduction stability, and rewriting characteristics at 2× speed or higher can be obtained by using MSbTe (M is V, Nb, Ta, Ti, or Ge or a mixture of Ge and one of V, Nb, Ta, Ti) as the phase-change recording film material. However, it has been found that, even when MSbTe (M is a mixture of Ge and V, i.e., MSbTe is GeVSbTe) is used for the phase-change recording film of the semi-transparent information layer of a dual-layer rewritable information recording medium, it is difficult to simultaneously achieve both good reproduction stability and good high-speed rewriting characteristics at 4× speed or higher.

Specifically, in order to allow the semi-transparent information layer of the dual-layer rewritable information recording medium to have a semi-transparent structure, each of the recording film and the reflection film, which are metal layers, must have a small thickness. However, when the recording film is formed to have a small thickness, the crystallization speed decreases, and therefore difficulty arises in rewriting. Moreover, when the reflection film is formed to have a small thickness, a slow-cooling structure is formed. In this case, the heat generated in the recording film irradiated with a laser beam is not readily dissipated, and therefore the recording characteristics and the reproduction stability deteriorate significantly.

In addition, in multi-layer recording media having two or more information layers, the reflectivity of each layer is low. Therefore, a high reproduction power must be used to obtain a sufficient amount of light reflected from the each layer. However, if a high reproduction power is used, the reproduction stability is significantly impaired.

As described above, it is much more difficult to simultaneously achieve both good high-speed rewriting characteristics (erasing characteristics) and good reproduction stability at a high reproduction power in the semi-transparent information layer of a dual-layer rewritable recording medium than in that of a single-layer rewritable recording medium. However, the inventors have found that the reproduction durability of a rewritable phase-change optical recording medium can be improved by suppressing a change in the degree of modulation caused by durability of repeated reproduction of the recording medium to 5% or less. In this manner, there can be provided a semi-transparent information layer of a dual-layer rewritable information recording medium that has excellent high-speed rewriting characteristics at 4× speed or higher and excellent reproduction stability at a high reproduction power.

In summary, the above-described objectives are achieved by the following embodiments of the present invention.

(1) A rewritable phase-change optical recording medium, comprising: a substrate; a first information layer that is provided on a laser beam incident side of the substrate; and at least one semi-transparent information layer that is provided on the laser beam incident side of the substrate and is located farther away from the substrate than is the first information layer; wherein the semi-transparent information layer includes a recording film that exhibits a phase change between crystalline and amorphous states to provide rewritability, by using an optical system with $\lambda/NA \leq 500$ nm, where NA is a numerical aperture of an objective lens and $\lambda$ is a wavelength of a laser beam, and wherein the recording film is formed of a material that exhibits a change in degree of modulation of 5% or less when recorded information is repeatedly reproduced, the change in degree of modulation being a change from when the number of times of reproduction is 100,000 to when the number of times of reproduction is 400,000.

(2) A rewritable phase-change optical recording medium, comprising: a substrate; a first information layer that is provided on a laser beam incident side of the substrate; and at least one semi-transparent information layer that is provided on the laser beam incident side of the substrate and is located farther away from the substrate than is the first information layer; wherein the semi-transparent information layer includes a recording film that exhibits a phase change between crystalline and amorphous states to provide rewritability, by using an optical system with $\lambda/NA \leq 500$ nm, where NA is a numerical aperture of an objective lens and $\lambda$ is a wavelength of a laser beam, and wherein, when an amorphous mark formed in the recording film is irradiated with the laser beam during reproduction, crystallization of the amorphous mark occurs in a central track portion extending in a scanning direction of the laser beam.

(3) A rewritable phase-change optical recording medium, comprising: a substrate; a first information layer that is provided on a laser beam incident side of the substrate; and at least one semi-transparent information layer that is provided on the laser beam incident side of the substrate and is located farther away from the substrate than is the first information layer; wherein the semi-transparent information layer includes a recording film that exhibits a phase change between crystalline and amorphous states to provide rewritability, by using an optical system with $\lambda/NA \leq 500$ nm, where NA is a numerical aperture of an objective lens and $\lambda$ is a wavelength of a laser beam, and wherein the recording film has an amorphous mark formed therein, the amorphous mark after repeated reproduction including a pair of narrow strip-shaped marks and a widthwise intermediate portion formed between the pair of narrow strip-shaped marks, the pair of narrow strip-shaped marks extending parallel to a scanning direction of the laser beam, the widthwise intermediate portion being crystallized and being located in a central portion in a width direction of the amorphous mark, the width direction being orthogonal to the scanning direction of the laser beam.

(4) The rewritable phase-change optical recording medium according to any of (1) to (3), wherein high frequency modulation is applied to the laser beam during reproduction under the conditions of a frequency of 350 MHz or more, a Ratio of more than 6, and a pulse width of 250 psec or more.

(5) The rewritable phase-change optical recording medium according to any of (1) to (4), wherein the recording film contains Sb as a main component.

(6) The rewritable phase-change optical recording medium according to (5), wherein the recording film further contains V or V and In as secondary components.

(7) The rewritable phase-change optical recording medium according to (6), wherein an amount of V is 2 at % or more and 9 at % or less.

(8) The rewritable phase-change optical recording medium according to any of (1) to (7), wherein the semi-transparent information layer includes a reflection film provided on a side opposite to the laser beam incident side of the recording film, the reflection film having a thickness of 8 nm or more and 16 nm or less.

(9) The rewritable phase-change optical recording medium according to any of (1) to (8), wherein the semi-transparent information layer includes an interface layer in contact with the laser beam incident side of the recording film, the interface layer containing at least Cr and O.

(10) The rewritable phase-change optical recording medium according to any of (1) to (9), wherein the semi-transparent information layer includes a heat sink layer, a dielectric layer, an interface layer, and the recording film in that order from the laser beam incident side, the heat sink layer being formed of one of AlN and SiN.

(11) The rewritable phase-change optical recording medium according to (10), wherein the interface layer is formed of a $ZrO_2$—$Cr_2O_3$ film containing at least $ZrO_2$ and $Cr_2O_3$, the $ZrO_2$—$Cr_2O_3$ film having a thickness of 2 nm or more and 10 nm or less.

(12) The rewritable phase-change optical recording medium according to (11), wherein the $ZrO_2$—$Cr_2O_3$ film contains $ZrO_2$ in an amount of 20 mol % or more and 90 mol % or less and $Cr_2O_3$ in an amount of 10 mol % or more and 80 mol % or less.

(13) The rewritable phase-change optical recording medium according to (11) or (12), wherein the $ZrO_2$ is stabilized $ZrO_2$ containing $Y_2O_3$, the stabilized $ZrO_2$ having a compositional ratio of $ZrO_2:Y_2O_3=(100-x):x$ (mol %) with $2 \leq x \leq 10$.

According to the present invention, a rewritable phase-change optical recording medium can be provided which has excellent reproduction durability at a high reproduction power even when a multi-layer structure is employed and the recording speed is increased. This is achieved by designing the recording medium such that the amount of reduction in the degree of modulation caused by durability of repeated reproduction saturates to a certain value.

DETAILED DESCRIPTION OF THE PREFERRED EMBODIMENTS

Figure 1:
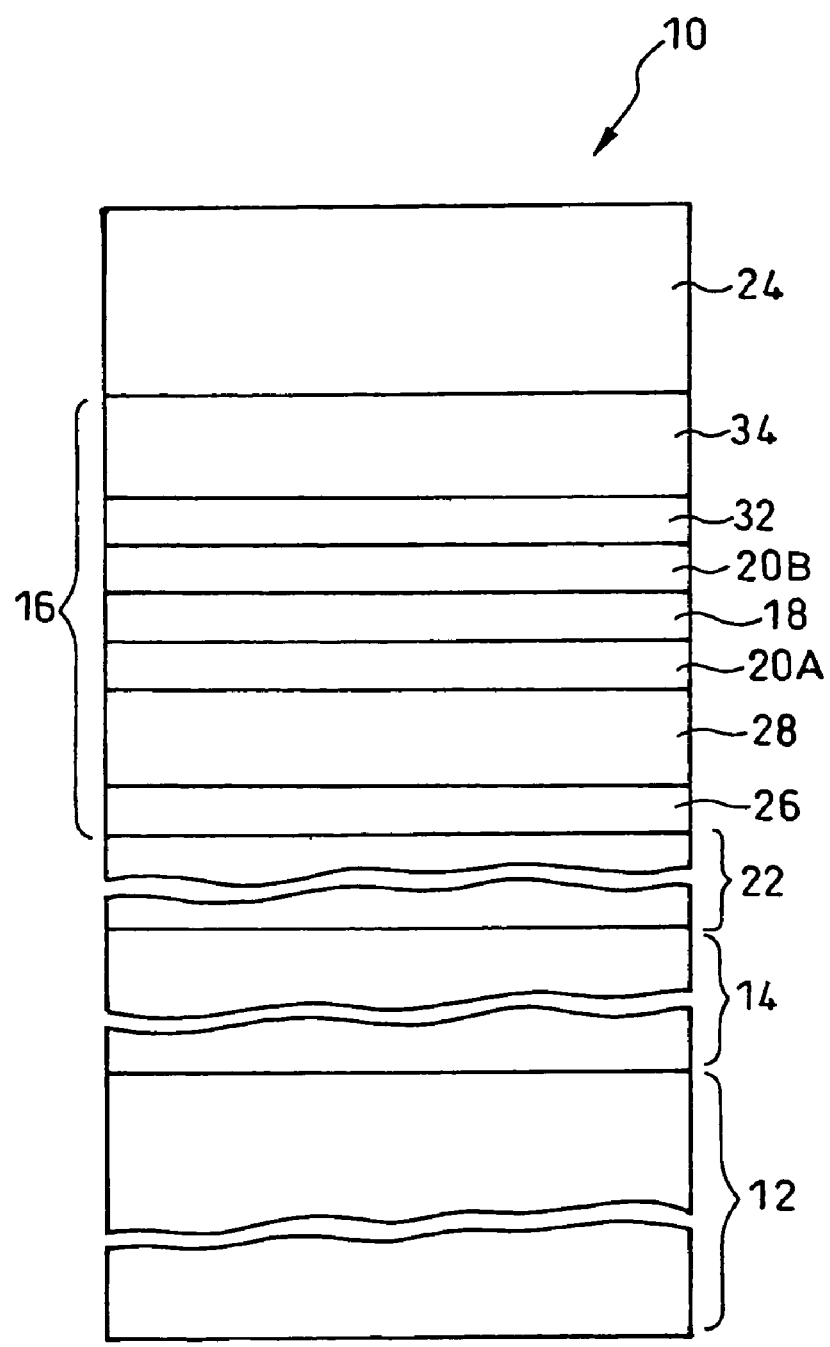
FIG. 1 is a cross-sectional view schematically illustrating an optical recording medium according to a first exemplary embodiment of the present invention.

A rewritable phase-change optical recording medium according to the best mode includes: a substrate; a first information layer that is provided on a laser beam incident side of the substrate; and at least one semi-transparent information layer that is provided on the laser beam incident side of the substrate and is located farther away from the substrate than is the first information layer. The semi-transparent information layer is configured to include a recording film formed of a phase-change recording film material that exhibits a phase change between crystalline and amorphous states to provide rewritability. The phase-change recording film material includes: Sb as a main component; and V or V and In as secondary components. The recording film is configured such that the amount of reduction in the degree of modulation caused by durability of repeated reproduction saturates to a certain value. Specifically, an optical system with $\lambda/NA \leq 500$ nm is used, where NA is the numerical aperture of the objective lens and $\lambda$ is the wavelength of the reproduction laser beam. High frequency modulation is applied to the reproduction laser beam under the conditions of a frequency of 350 MHz or higher, a Ratio of greater than 6, and a pulse width of 250 psec or more. When the recording film is irradiated with the reproduction laser beam, crystallization of amorphous marks formed in the recording film occurs only in a central portion in the widthwise direction of each of the amorphous marks. The widthwise direction is orthogonal to the scanning direction of the laser beam. In this manner, the amount of reduction in the degree of modulation is suppressed.

For example, the semi-transparent information layer is configured by sequentially depositing a first dielectric layer, a reflection layer, a protection layer, the recording film, a protection layer, a second dielectric layer, and a heat sink layer.

The first dielectric layer is provided for protecting the reflection layer and for adjusting the light transmittance. No particular limitation is imposed on the material for the first dielectric layer, and examples of the material include oxides, nitrides, sulfides, carbides, and fluorides containing at least one metal selected from the group consisting of Ti, Zr, Hf, Ta, Si, Al, Mg, Y, Ce, Zn, In, Cr, Nb, and the like, and combinations thereof. In the best exemplary embodiment, the first dielectric layer is formed of titanium oxide ($TiO_2$) or a material containing zirconium oxide ($ZrO_2$) as a main component. Preferably, the first dielectric layer is formed of $TiO_2$ or a material containing $ZrO_2$, $Cr_2O_3$, and $Al_2O_3$. In the above case, the main component refers to that the molar ratio thereof to the total moles of all the components is 50% or more. The thickness D1 of the first dielectric layer is preferably $5 \text{ nm} \leq D1 \leq 60 \text{ nm}$. When the thickness D1 is less than 5 nm, the protection of the reflection layer is insufficient. When the thickness D1 is greater than 60 nm, the light transmittance falls outside a preferred range. The first dielectric layer may be formed by depositing two or more dielectric layers. In such a case, it is preferable to use a dielectric material having a low refractive index for a dielectric layer near the substrate side and to use a dielectric material having a high refractive index for a dielectric layer near the reflection layer. For example, a material containing $ZrO_2$ as a main component may be used as the dielectric material having a low refractive index, and $TiO_2$ may be used as the dielectric material having a high refractive index.

The reflection layer is provided for obtaining heat dissipation and light interference effects. Preferably, an Ag alloy is used as the material for the reflection layer. In order to allow the information layer to have a semi-transparent structure, the thickness Tr of the reflection layer is $0 \text{ nm} < Tr < 30 \text{ nm}$. In order to obtain optimal reflectivity and light transmittance, the thickness Tr is preferably $8 \text{ nm} \leq Tr \leq 16 \text{ nm}$. When the thickness Tr of the reflection layer is 0 nm, the heat dissipation effect is not obtained. When the thickness Tr is 30 nm or more, the transmittance is reduced, and difficulty arises in recording on the L0 layer.

The protection layer protects the recording film, controls the crystallization speed, and dissipates heat to the reflection layer. The material for the protection layer contains at least Cr and O. The protection layer is preferably formed of at least Cr, Zr, and O and more preferably formed of at least $Cr_2O_3$ and $ZrO_2$. $Cr_2O_3$ increases the crystallization speed, and $ZrO_2$ decreases the film stress. When the ratio of $Cr_2O_3$ is high, the crystallization speed can be easily increased. However, when the ratio of $Cr_2O_3$ is too high, the light transmittance is reduced. The preferred ratio of $Cr_2O_3$ constituting the protection layer near a beam incident surface is 10 mol % or more and 80 mol % or less, and the preferred ratio of $ZrO_2$ is 20 mol % or more and 90 mol % or less. The preferred ratio of $Cr_2O_3$ constituting the protection layer near the reflection layer is 5 mol % or more and 70 mol % or less, and the preferred ratio of $ZrO_2$ is 30 mol % or more and 95 mol % or less. Preferably, the ratio of $Cr_2O_3$ is higher in the protection layer near the beam incident surface that is in contact with the recording film than in the protection layer near the reflection layer. The preferred thickness of the protection layers is 3 nm or more and 10 nm or less. Preferably, stabilized $ZrO_2$ containing a rare earth oxide in an amount of several mole percent is used as the above $ZrO_2$. $Y_2O_3$ is preferred as the above rare earth oxide, and the ratio of $Y_2O_3$ in 100 mol % of the stabilized $ZrO_2$ is 2 mol % or more and 10 mol % or less.

The preferred thickness Trec of the recording film is 3 nm≦Trec≦8 nm. When the thickness Trec is less than 3 nm, the crystallization speed is reduced, and therefore difficulty arises in erasing (crystallizing) amorphous marks. When the thickness Trec is greater than 8 nm, the transmittance thereof is reduced, and therefore difficulty arises in recording on the L0 layer. Moreover, when the thickness of the recording film is large, an excessive amount of heat is accumulated in the recording film itself when recording is performed, so that the recording characteristics deteriorate.

The configuration of the above layers and the recoding film ensures that the semi-transparent information layer as a whole has a light transmittance of 30% or more and 80% or less at a recording wavelength. This is because, when the light transmittance of the semi-transparent information layer is less than 30%, difficulty arises in recording in an information layer located farthest away from the laser beam incident surface and because, when the light transmittance exceeds 80%, difficulty arises in recording in the semi-transparent information layer. The above is a typical condition required for the semi-transparent information layer.

The recording film contains at least Sb as a main component. In the above case, the main component refers to that the amount thereof is 40 at % or more. The recording film may further contain at least one additive element selected from the group consisting of Ge, In, Te, V, Mg, Al, Si, Mn, Zn, Ga, Sn, Bi, and the like. Preferably, the recording film contains Ge, In, Te, and V, and the preferred compositional ranges thereof are: 65≦Sb≦80, 8≦Ge≦18, 4≦In≦15, 3≦Te≦10, and 0.5≦V≦10 (at %).

When the amount of Sb is low, the crystallization speed decreases, and difficulty arises in rewriting. When the amount of Sb is large, the crystallization speed increases, but the thermal stability of the amorphous marks decreases. When the amount of Ge is low, the thermal stability of the amorphous marks decreases. When the amount of Ge is large, the crystallization speed decreases, and difficulty arises in rewriting. When the amount of In is low, the reproduction durability decreases. When the amount of In is large, the crystallization speed decreases, and difficulty arises in rewriting. When the amount of Te is low, the reproduction durability decreases. When the amount of Te is large, the crystallization speed decreases, and difficulty arises in rewriting.

As described above, the preferred thickness of the recording film is 3 nm or more and 8 nm or less. In addition, the preferred thickness of the recording film of the L1 layer of a dual-layer medium is 4 nm or more and 6 nm or less. When the film thickness is small, the crystallization speed decreases, and difficulty arises in rewriting. In addition, the difference in reflectivity before and after recording decreases. When the film thickness is large, the transmittance decreases, and difficulty arises in recording in a layer located farthest away from the light incident surface.

The second dielectric layer adjusts the optical characteristics and controls heat dissipation from the recording film to the heat sink layer. No particular limitation is imposed on the material for the second dielectric layer, and examples of the material include oxides, nitrides, sulfides, carbides, and fluorides containing at least one metal selected from the group consisting of Ti, Zr, Hf, Ta, Si, Al, Mg, Y, Ce, Zn, In, Cr, Nb, and the like, and combinations thereof. Preferably, the second dielectric layer is formed of a mixture of ZnS and $SiO_2$. The preferred molar ratio of ZnS to $SiO_2$ is 50:50 to 95:5. When the molar ratio falls outside this range, the refractive index of the mixture of ZnS and $SiO_2$ is changed to cause difficulty in adjustment of the optical characteristics. The thickness $D_2$ of the second dielectric layer is preferably 5 nm≦$D_2$≦50 nm. When the thickness is less than 5 nm, difficulty arises in protection of the recording film and in adjustment of the optical characteristics. When the thickness is greater than 50 nm, heat dissipation from the recording layer to the heat sink layer is impaired.

The heat sink layer is provided for controlling heat dissipation from the recording film and for enhancing the cooling effect on the recording film to thereby facilitate the accurate formation of the amorphous marks. No particular limitation is imposed on the material for the heat sink layer. For example, a material having a thermal conductivity higher than that of the material for the second dielectric layer is preferred as the material for the heat sink layer, and preferred examples of such a material include AlN, SiN, BN, $Al_2O_3$, and $TiO_2$. In the best exemplary embodiment, the heat sink layer is formed of AlN or SiN. The preferred thickness of the heat sink layer is determined depending on the reflectivity and the reproduction durability of the optical recording medium. For example, in a dual-layer optical recording medium, the reflectivity is adjusted to preferably 3% or more and 7% or less. The reflectivity is adjusted by changing the thicknesses of the dielectric layers, the recording film, the reflection layer, the heat sink layer, and other layers. The thickness Theat of the heat sink layer is preferably 15 nm≦Theat≦150 nm and more preferably 20 nm≦Theat≦120 nm. When the thickness Theat of the heat sink layer is less than 15 nm, the effect of dissipating heat from the recording film is reduced. In addition, when the thickness of the heat sink layer is more than 150 nm, the time required for deposition increases, and this results in a reduction in productivity.

The first and second dielectric layers may be constituted by a single dielectric layer or two or more dielectric layers.

As described above, in a multi-layer optical recording medium having two or more information layers on one side, the reproduction laser power for reading recorded signals must be high because the reflectivity of each layer is low. In addition, when the linear velocity for recording is increased in order to perform high speed recording, i.e., when the rotation speed of the disc is increased, a pickup cannot easily follow the grooves on the disc, and therefore servo control is not stabilized. Therefore, when high-speed recording is performed, the reproduction power must be increased to stabilize the servo control.

In addition, in an optical pickup of an optical disc drive, high frequency modulation is performed in order to reduce noise of the diode laser caused by the returning beam.

Therefore, the reproduction power used is 0.6 mw or more and preferably 0.7 mw or more. The high frequency modulation is performed under the conditions of a frequency of 300 to 500 MHz, a Ratio of 3 to 8, and a pulse width of 200 to 400 psec. More preferably, the high frequency modulation is performed under the conditions of a frequency of 350 MHz or higher, a Ratio of greater than 6, and a pulse width of 250 psec of more.

First Exemplary Embodiment

Hereinbelow, an optical recording medium 10 according to a first exemplary embodiment of the present invention is described in detail with reference to FIG. 1.

This optical recording medium 10 includes: a substrate 12; a first information layer 14 which is provided on a laser beam incident surface side (the upper side in FIG. 1) of the substrate 12; and a second information layer 16 (semi-transparent information layer) which is provided on the laser beam incident surface side and is located farther away from the substrate 12 than is the first information layer 14. The second information layer 16 is configured to include: a recording film 18; and protection layers 20A and 20B provided on opposite sides of the recording film 18 so as to be adjacent to the recording film 18.

A spacer layer 22 is provided between the first information layer 14 and the second information layer 16. In addition, a cover layer 24 is provided on the beam incident surface side of the second information layer 16.

The second information layer 16 includes: a first dielectric layer 26 formed of a $ZrO_2$—$Cr_2O_3$—$Al_2O_3$ (65:10:25 mol %) film having a thickness of 5 nm; a reflection layer 28 formed of an AgCu film having a thickness of 12 nm; the protection layer 20A formed of a $ZrO_2$—$Cr_2O_3$ (50:50 mol %) film having a thickness of 4 nm; the recording film 18 formed of an Sb-based eutectic phase change material containing Sb as a main component and having a thickness of 6 nm; the protection layer 20B formed of a $ZrO_2$—$Cr_2O_3$ (50:50 mol %) film having a thickness of 5 nm; a second dielectric layer 32 formed of a $ZnS$—$SiO_2$ (80:20 mol %) film having a thickness of 13 nm; and a heat sink layer 34 formed of an AlN film having a thickness of 45 nm. These layers are formed in that order from the spacer layer 22 side by means of sputtering.

The substrate 12 is formed of polycarbonate and has a thickness of 1.1 mm. The spacer layer 22 is formed to a thickness of 25 am, and the cover layer 24 is formed of an ultraviolet curable resin and to a thickness of 75 µm by means of a spin coating method. This cover layer 24 is formed after the entire second information layer 16 is crystallized using an initializer.

Samples 1 to 4 and 6 to 8 of the optical recording medium 10 having the above configuration were produced. In this case, sputtering targets having the compositions shown in Table 1 were used as the recording film materials forming the recording film 18. Samples 5 and 9 are optical recording media of comparative examples.

TABLE 1

|  | Sb | Ge | V | In | Te | Bi |
|---|---|---|---|---|---|---|
| Sample 1 | 74.7 | 8.5 | — | 7.8 | 9.0 | — |
| Sample 2 | 73.0 | 9.0 | — | 9.9 | 8.1 | — |
| Sample 3 | 74.1 | 8.4 | 1.1 | 7.6 | 8.8 | — |
| Sample 4 | 72.6 | 8.3 | 2.3 | 7.6 | 9.2 | — |
| Sample 5 | 79.0 | 9.0 | — | — | 12.0 | — |
| Sample 6 | 76.8 | 8.8 | 2.6 | — | 11.7 | — |
| Sample 7 | 74.8 | 8.5 | 5.3 | — | 11.4 | — |
| Sample 8 | 72.7 | 8.3 | 7.9 | — | 11.1 | — |
| Sample 9 | — | 42.7 | — | — | 53.2 | 4.2 |

The values in Table 1 represent compositional ratios (at %) of the respective elements. The thickness of the recording film 18 was 6 nm for samples 1 to 4, 7 nm for samples 5 to 8, and 8 nm for sample 9.

A description will be given of these samples. In samples 1 to 8, Sb was used as a main component. In sample 9, GeTe was used as a main component. In samples 3 and 4, Ge, V, In, and Te were used as secondary components. In samples 1 and 2, Ge, In, and Te were used as secondary components, but V was not used. In samples 6 to 8, Ge, V, and Te were used as secondary components, In was not used. In sample 5, Ge and Te were used as secondary components, but V and In were not used. In sample 9, Bi was used as a secondary component, Sb, V, and In were not used.

Mixed signals were recorded on each of these samples 1 to 9, and a jitter value was measured at a linear velocity of 1× speed. Then, reproduction was repeated 10,000 times at a linear velocity of 2× speed while the reproduction power Pr was changed from 0.9 mW to 1.1 mw, to 1.3 mW, and then to 1.5 mW. Subsequently, the jitter value was measured at a linear velocity of 1× speed, and the amount (%) of deterioration in jitter value before and after 10,000 times of reproduction was determined.

The results are shown in Table 2.

TABLE 2

| | Amount of deterioration in jitter (%) | | | |
|---|---|---|---|---|
| | 0.9 mW | 1.1 mW | 1.3 mW | 1.5 mW |
| Sample 1 | 0 | 2.3 | NG | NG |
| Sample 2 | 0 | 0 | 1.4 | 6.1 |
| Sample 3 | 0 | 0 | 7.5 | NG |
| Sample 4 | 0 | 0 | 0 | 0.4 |
| Sample 5 | NG | NG | NG | NG |
| Sample 6 | 0 | 0 | 0 | 0 |
| Sample 7 | 0 | 0 | 0 | 0 |
| Sample 8 | 0 | 0 | 0 | 0 |
| Sample 9 | 0 | 3.9 | NG | NG |

The values in Table 2 represent the amount (%) of deterioration in jitter value, and "NG" represents that the jitter value could not be measured after 10,000 times of reproduction. As can be seen from Table 2, almost no deterioration in jitter value was found in samples 4 and 6 to 8 even after the reproduction was repeated 10,000 times at Pr=1.5 mW. In sample 2, the amount of deterioration in jitter value was not "NG" at Pr=1.5 mW and was smaller at Pr=1.3 mW. In sample 3, the amount of deterioration in jitter value was "NG" at Pr=1.5 mW but was not "NG" after the reproduction was repeated 10,000 times at Pr=1.3 mW. However, in samples 1, 5, and 9, the amount of deterioration in jitter value was "NG" at Pr=1.3 mW and 1.5 mW.

As can be seen from the compositions of the recording films 18 shown in Table 1, what samples 1, 5, and 9 have in common is that they do not contain V.

Therefore, it can be said that the samples containing V exhibited almost no deterioration in jitter value even after repeated reproduction at a high reproduction power. As can be seen from the results for samples 3 and 4, also in the samples containing In in addition to V, the amount of deterioration in jitter value was small. Moreover, as can be seen from the results for sample 2, also in the sample containing In instead of V, the amount of deterioration in jitter value was small.

Figure 2:
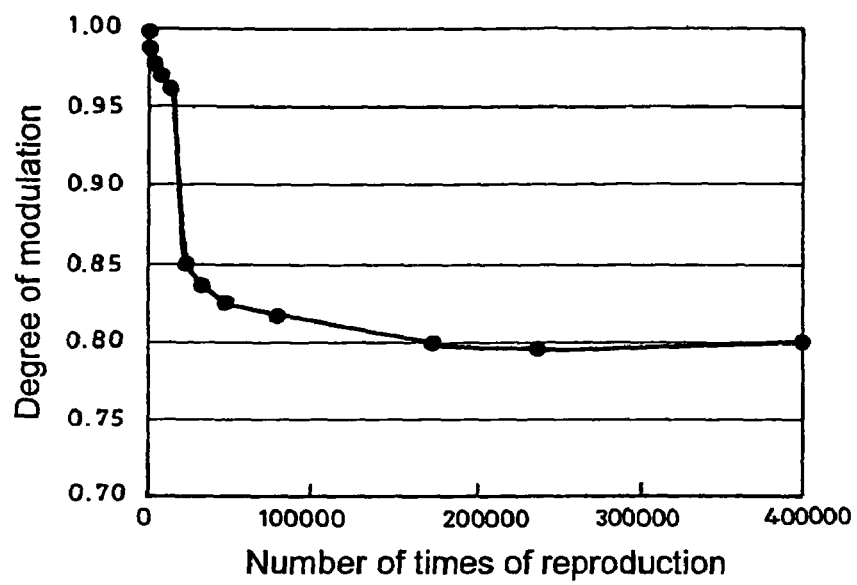
FIG. 2 is a graph showing the change in the degree of modulation versus the number of times of reproduction of an optical recording medium according to the first exemplary embodiment of the present invention.

Next, for each of samples 1 and 9, reproduction was repeated at a linear velocity of 2× speed and Pr=0.99 mW to evaluate reproduction durability. A change in the degree of modulation of signals versus the number of times of reproduction is shown in the graph of FIG. 2 for sample 1 and in the graph of FIG. 3 for sample 9. In this instance, the change in the degree of modulation is a value represented by Rini/Rafter, where Rini is the initial reflectivity of a mark portion and Rafter is the reflectivity of the mark portion after durability of reproduction occurs. When the durability of reproduction occurs, the amorphous mark is crystallized and reduced in size, and the reflectivity of the mark portion approaches the reflectivity of a crystalline portion having a reflectivity higher than that of the mark portion, so that the degree of modulation decreases.

Figure 3:
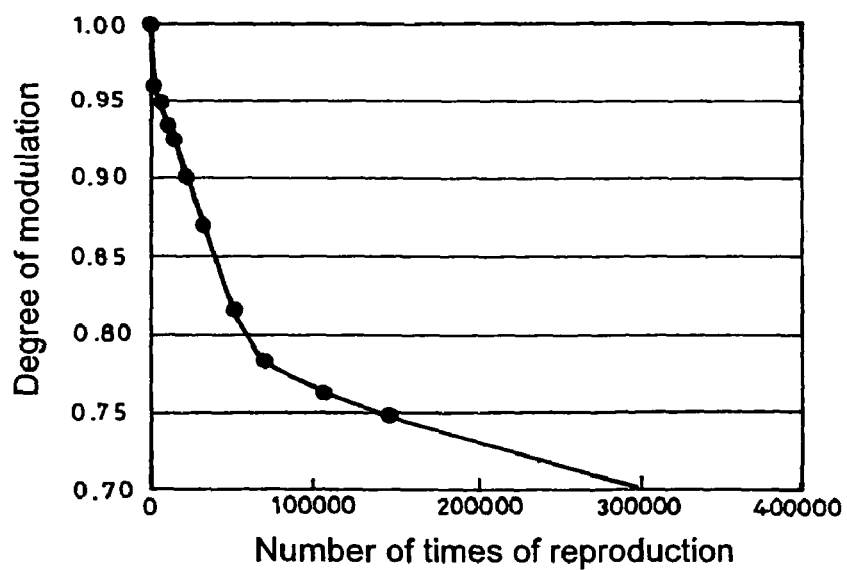
FIG. 3 is a graph showing the change in the degree of modulation versus the number of times of reproduction of an optical recording medium of a comparative example of the present invention.

As can be seen from FIG. 3, in sample 9 in which GeTe was used as a main component, the degree of modulation decreased continuously as the number of times of reproduction increased, and the degree of modulation decreased to 0.70 when the number of times of reproduction was 300,000. However, as can be seen from FIG. 2, in sample 1 in which Sb was used as a main component, the degree of modulation decreased as the number of times of reproduction increased until the degree of modulation reached 0.80. However, the degree of modulation did not decrease as the number of times of reproduction increased further.

The change in the degree of modulation from when the number of times of reproduction was 100,000 to when it was 400,000 was 2% for sample 1 and 10% for sample 9. For each of samples 2 to 8, the evaluation of reproduction durability was also performed while the reproduction power was changed. The results showed that the change in the degree of modulation was similar to that of sample 1 shown in FIG. 2. Accordingly, it was found that the manner of change in the degree of modulation caused by durability of reproduction in the phase-change recording film materials containing Sb as a main component was greatly different from that in the phase-change recording film material containing GeTe as a main component.

Figure 4:
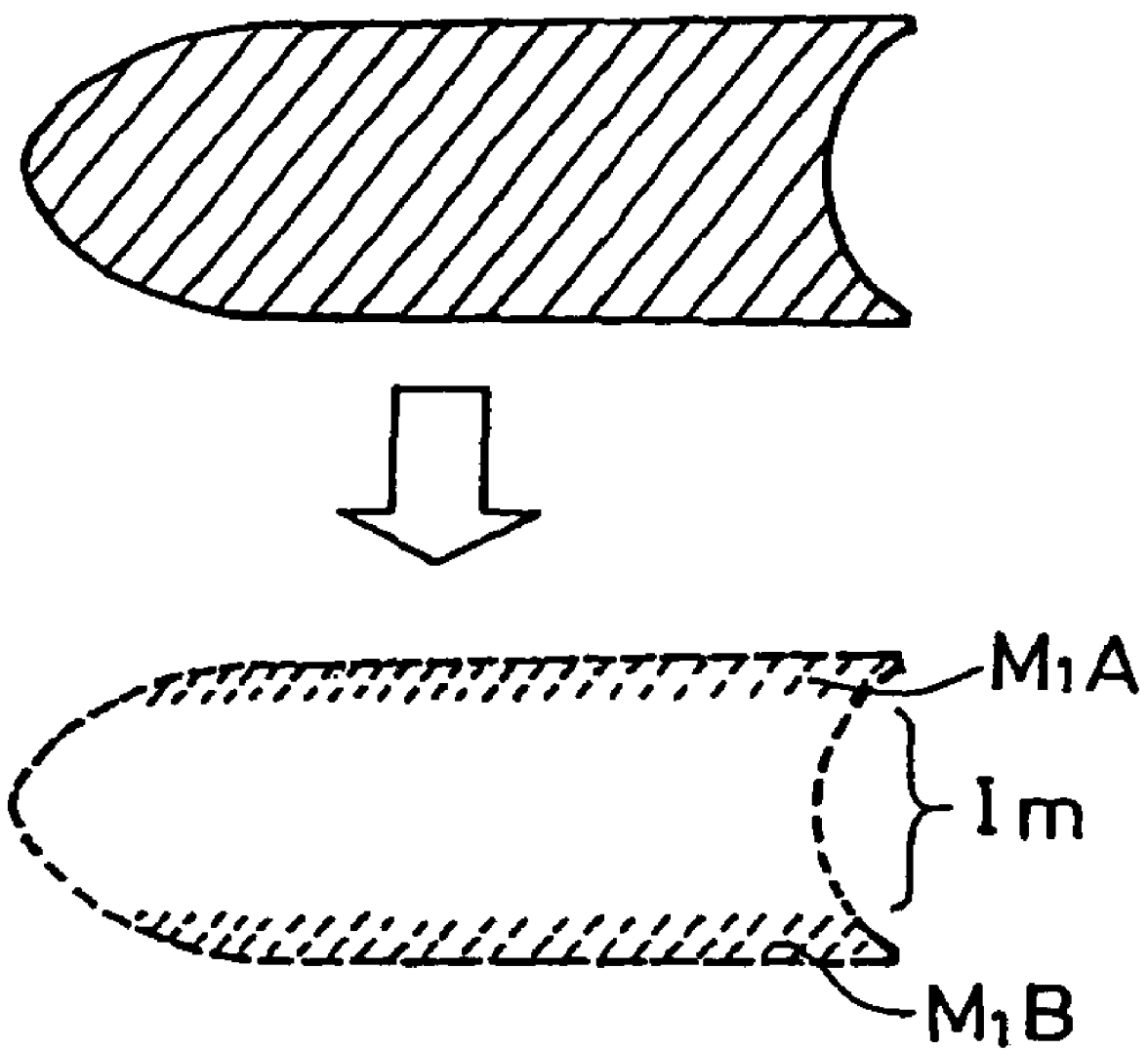
FIG. 4 is a schematic diagram illustrating the crystallization states of an amorphous mark before and after repeated reproduction, the amorphous mark being formed in a recording film of the optical recording medium according to the first exemplary embodiment of the present invention.
Figure 5:
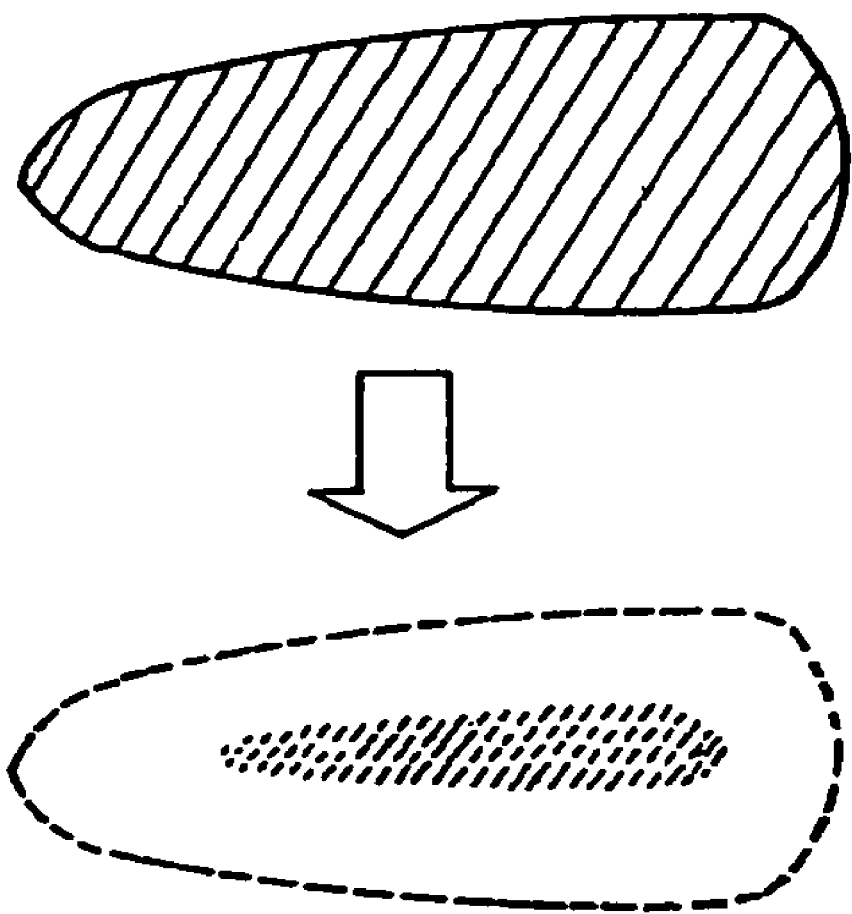
FIG. 5 is a schematic diagram illustrating the crystallization states of an amorphous mark before and after repeated reproduction, the amorphous mark being formed in a recording film of the optical recording medium of the comparative example of the present invention.

After the reproduction was repeated, the crystallization state of the amorphous marks formed in the recording film of each of samples 1 and 9 was observed under a TEM (Transmission Electron Microscope). The crystallization state of the amorphous mark is schematically shown in FIG. 4 for sample 1 and in FIG. 5 for sample 9. In FIGS. 4 and 5, the amorphous region is diagonally shaded. As can be seen from FIG. 5, in sample 9 in which GeTe was used as a main component, the amorphous mark after repeated reproduction has a crystallized portion extending inwardly from the periphery of the mark. Specifically, the amorphous portion has a shape shorter in the scanning direction of the laser beam and narrower in the width direction orthogonal to the scanning direction than the original amorphous mark.

In sample 1, the amorphous mark after repeated reproduction is composed of a pair of narrow strip-shaped marks $M_1A$ and $M_1B$ extending parallel to the scanning direction of the laser beam, and an intermediate region Im, which is a central track portion in the scanning direction of the laser beam, is crystallized. The narrow strip-shaped marks $M_1A$ and $M_1B$ do not necessarily have the same width and should have a width that can be recognized by the scan with the laser beam.

The laser beam has a Gaussian intensity distribution in the laser spot. Therefore, when a mark is irradiated with the laser beam, the central portion of the mark is heated to a higher temperature than the periphery portion thereof, and the amorphous phase in the central portion is more easily crystallized. Accordingly, when durability of reproduction occurs in the same manner as in sample 9, the crystallization of the amorphous mark proceeds until the mark disappears completely. However, when durability of reproduction occurs in the same manner as in sample 1, although the intermediate region Im, which is the central track portion in the scanning direction of the laser beam, is crystallized, the narrow strip-shaped marks $M_1A$ and $M_1B$ located in the edge portions of the laser spot are not crystallized. This is because the marks $M_1A$ and $M_1B$ are heated to a lower temperature when irradiated with the laser beam. Therefore, a reduction in the degree of modulation of a recording signal caused by durability of reproduction does not occur.

With the phase-change recording film materials containing Sb as a main component, the degree of modulation decreases until the number of times of reproduction reaches several tens of thousands. In the course of this process, the intermediate portion Im of the amorphous mark, which is the central track portion in the scanning direction of the laser beam, is gradually crystallized. After the intermediate portion Im is completely crystallized, the crystallization of the amorphous mark does not proceed further even when the number of times of reproduction is increased. Therefore the degree of modulation is no longer reduced, and the signal quality is maintained. In addition, with the phase-change recording film materials containing Sb as a main component and further containing V, the reproduction durability can be significantly improved.

Figure 6:
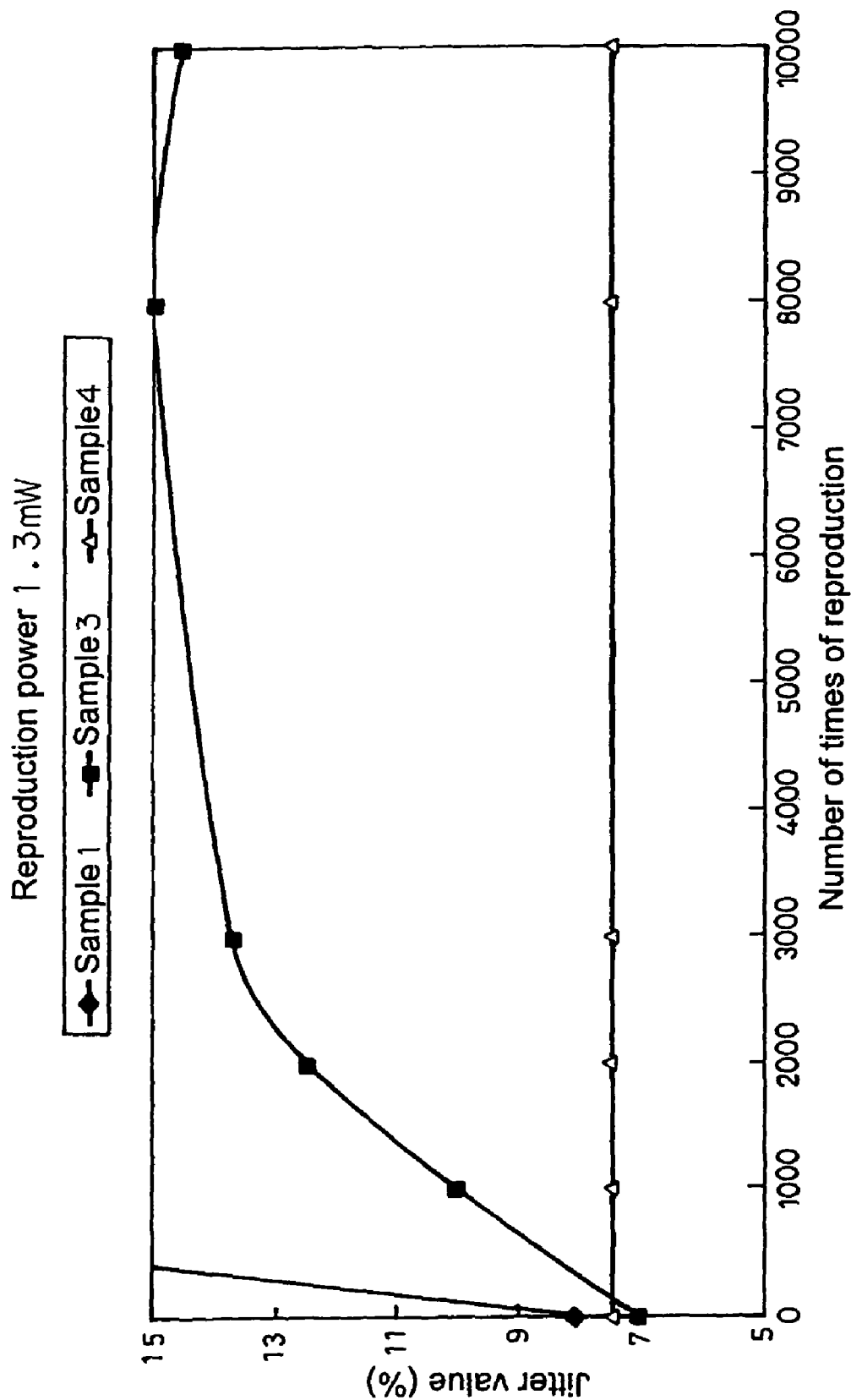
FIG. 6 is a graph showing jitter value versus the number of times of reproduction of optical recording media according to the first exemplary embodiment of the present invention.

FIG. 6 and Table 3 show the relationship between the amount (%) of deterioration in jitter value and the number of times of reproduction at a reproduction power of 1.3 mW for each of samples 1, 3, and 4.

TABLE 3

| Number of times of reproduction | Sample No. | | |
| --- | --- | --- | --- |
| | Sample 1 | Sample 3 | Sample 4 |
| 1 | 8.1 | 7.05 | 7.5 |
| 1000 | 25.0 | 10.05 | 7.5 |
| 2000 | — | 12.45 | 7.5 |
| 3000 | — | 13.7 | 7.5 |
| 8000 | — | 15 | 7.5 |
| 10000 | — | 14.55 | 7.5 |

For sample 1 in which the amount of V is 0 at %, the degree of durability of reproduction was considerable when the number of times of reproduction exceeded 1,000. Therefore, in Table 3, the amount of deterioration in jitter value after 2,000 times of repeated reproduction is represented by a dash "-." For sample 3 in which the amount of V is 1 at %, the amount of deterioration in jitter value reached about 10% when the reproduction was repeated 1,000 times.

However, for sample 4 in which the amount of V is 2 at %, the amount of deterioration in jitter value remained unchanged at 7.5% even when the reproduction was repeated 10,000 times.

As has been described, durability of reproduction is significant when the amount of V is less than 1 at %. However, the reproduction durability is significantly improved when the amount of V is at least 2 at %.

Second Exemplary Embodiment

Figure 7:
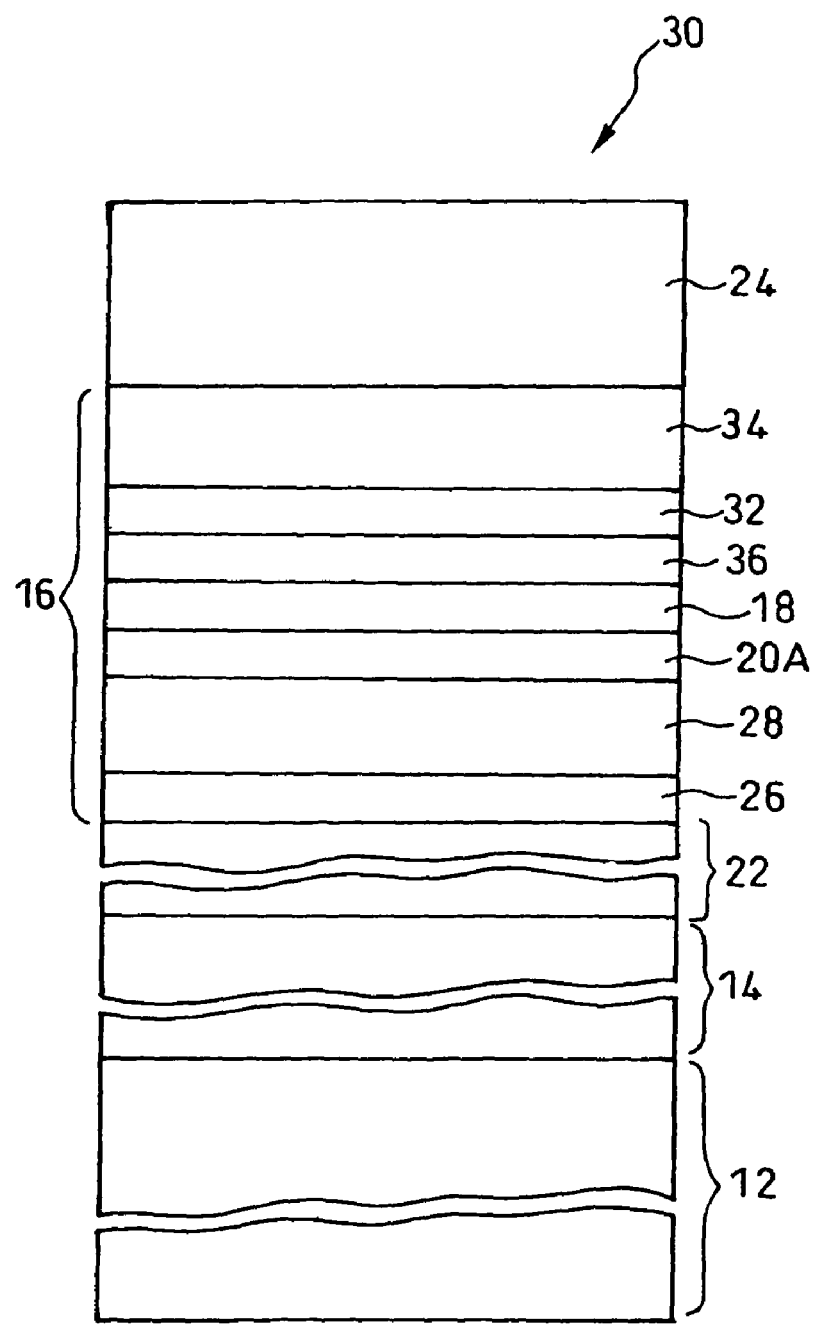
FIG. 7 is a cross-sectional view schematically illustrating an optical recording medium according to a second exemplary embodiment of the present invention.

Hereinbelow, an optical recording medium 30 according to a second exemplary embodiment of the present invention will be described with reference to FIG. 7. In contrast to the optical recording medium 10 of the first exemplary embodiment, the optical recording medium 30 includes an interface layer 36 in place of the protection layer 20B of the recording film 18. Since the other components are the same, the same reference numerals as those of the optical recording medium 10 are used, and a redundant description will be omitted.

The interface layer controls the crystallization speed and reproduction durability of the recording film. The material for the interface layer contains at least Zr, Cr, and O. Preferably, the interface layer is formed of $ZrO_2$ and $Cr_2O_3$. $Cr_2O_3$ improves the crystallization speed and the reproduction durability, and $ZrO_2$ improves the transparency of the film. When the ratio of $Cr_2O_3$ is too high, the transparency of the film decreases, so that the transmittance of the semi-transparent information layer is reduced. When the ratio of $ZrO_2$ is too high, the crystallization speed and the reproduction durability is reduced. The preferred ratio of $ZrO_2$ in the interface layer is 20 mol % or more and 90 mol % or less, and the preferred ratio of $Cr_2O_3$ is 10 mol % or more and 80 mol % or less. The preferred thickness of the interface layer is 2 nm or more and 10 nm or less. When the thickness is less than 2 nm, the crystallization speed and the reproduction durability are reduced. When the thickness is greater than 10 nm, the productivity is reduced.

Samples 11, 15, and 16 of the optical recording medium 30 were produced, and samples 10, 12 to 14, and 17 to 21 of comparative examples were produced. Specifically, each sample was formed by forming a first information layer on a PC substrate and providing a spacer layer having a thickness of 25 μm, a second information layer, and a cover layer having a thickness of 75 μm in that order on the first information layer. The first and second information layers were formed by sputtering, and the spacer layer and the cover layer were formed by a spin coating method. The second information layer includes a plurality of layers listed in Table 4, and the plurality of layers were deposited in the listed order. In Table 4, the material and thickness of the recording film are represented by a dash "-," and the details thereof are shown in Table 5.

TABLE 4

|  | Material | Thickness |
| --- | --- | --- |
| First dielectric layer | $ZrO_2$—$Cr_2O_3$—$Al_2O_3$ (65:10:25 mol %) | 5 nm |
| Reflection layer | AgCu | 12 nm |
| Protection layer | $ZrO_2$—$Cr_2O_3$ (50:50 mol %) | 4 nm |
| Recording film | — | — |
| Interface layer | $ZrO_2$—$Cr_2O_3$ (50:50 mol %) | 5 nm |
| Second dielectric layer | ZnS—$SiO_2$ (80:20 mol %) | 13 nm |
| Heat sink layer | AlN or SiN | 45 nm |

$ZrO_2$ contained in the first dielectric layer, the protection layer, and the interface layer is stabilized $ZrO_2$ containing 3 mol % of $Y_2O_3$ ($ZrO_2$:$Y_2O_3$=97:3 mol %).

The interface layer was not provided in samples 12, 17, and 21. In each of these samples, the second dielectric layer was formed to have a thickness of 18 nm. The heat sink layer was not provided in samples 18, 20, and 21. In each of these samples, the second dielectric layer was formed to have a thickness of 45 nm. The interface layer and the heat sink layer were not provided in samples 14 and 19. In each of these samples, the second dielectric layer was formed to have a thickness of 50 nm.

The material, composition, and thickness of the recording film, which were represented by the dash "-" in Table 4, are shown in Table 5.

TABLE 5

| Sample No. | Material | Composition | Thickness |
| --- | --- | --- | --- |
| Sample 10 | InSbTeGe | Same as sample 2 | 7 nm |
| Sample 11, 12 | InSbTeGeV | Same as sample 4 | 7 nm |
| Sample 13, 14 | SbTeGe | Same as sample 5 | 7 nm |
| Sample 15~19 | SbTeGeV | Same as sample 6 | 7 nm |
| Sample 20, 21 | GeBiTe | Same as sample 9 | 8 nm |

The composition of the recording film material of each sample of the present exemplary embodiment is the same as that of one of samples 2, 4, 5, and 6 of the first exemplary embodiment and sample 9 of the comparative example shown in Table 1. Therefore, in Table 5, each composition is represented by the sample number.

After being initialized, each sample was subjected to evaluation. BD2× speed (linear velocity: 9.84 m/s) and BD4× speed (linear velocity: 19.68 m/s) were used as the recording linear velocity. (n/2)T strategy was used as the recording strategy for each of 2× speed and 4× speed. The (n/2)T strategy is a recording strategy in which 2T and 3T marks are recorded with one pulse, 4T and 5T marks are recorded with two pulses, 6T and 7T marks are recorded with three pulses, and an 8T mark is recorded with four pulses.

Each sample was evaluated for the measured erasing ratio, the measured jitter, the degree of durability of reproduction, and the change in the degree of modulation.

The erasing ratio was determined as follows. After a single 8T signal was recorded at 2× or 4× speed, DC erasing was preformed one time at each of linear velocities of 2× speed and 4× speed. Then, the amount of reduction in carrier level of the 8T signal was measured using a spectrum analyzer. If the erasing ratio is 25 dB or more, the mark is regarded as an erasable mark.

The jitter was determined as follows. A mixed signal was recorded ten times at 2× or 4× speed. Subsequently, the recorded signal was reproduced at 1× speed and a reproduction power of 0.7 mW, and the jitter value at this time was measured. A practically acceptable level of the jitter value is 8.5% or less.

The degree of durability of reproduction was determined as follows. After a mixed signal was recorded ten times at 2× or 4× speed, the recorded signal was reproduced 10,000 times at a reproduction power of 0.7 mW for 2× speed and at a reproduction power of 1.3 mW for 4× speed. Subsequently, the jitter value was measured at 1× speed, so that the amount of deterioration in jitter value was determined. A practically acceptable level of the amount of deterioration in jitter value is 1% or less.

The evaluation results are shown in Table 6.

TABLE 6

|  | Film structure | | | 2 × speed | | | 4 × speed | | | Change in | |
| --- | --- | --- | --- | --- | --- | --- | --- | --- | --- | --- | --- |
| Sample No. | Recording film | Interface layer | Heat sink layer | Erasing ratio | Jitter | Durability of reproduction | Erasing ratio | Jitter | Durability of reproduction | degree of modulation | Overall evaluation |
| Sample 10 | InSbTeGe | $ZrO_2$—$Cr_2O_3$ | AlN | ○ | ○ | ○ | ○ | ○ | x | ○ | x |
| Sample 11 | InSbTeGeV | $ZrO_2$—$Cr_2O_3$ | AlN | ○ | ○ | ○ | ○ | ○ | ○ | ○ | ○ |
| Sample 12 | InSbTeGeV | None | AlN | ○ | ○ | ○ | x | x | — | ○ | x |
| Sample 13 | SbTeGe | $ZrO_2$—$Cr_2O_3$ | AlN | ○ | ○ | x | ○ | ○ | x | ○ | x |
| Sample 14 | SbTeGe | None | None | ○ | x | x | x | x | — | ○ | x |
| Sample 15 | SbTeGeV | $ZrO_2$—$Cr_2O_3$ | AlN | ○ | ○ | ○ | ○ | ○ | ○ | ○ | ○ |
| Sample 16 | SbTeGeV | $ZrO_2$—$Cr_2O_3$ | SiN | ○ | ○ | ○ | ○ | ○ | ○ | ○ | ○ |
| Sample 17 | SbTeGeV | None | AlN | ○ | ○ | ○ | x | x | — | ○ | x |

TABLE 6-continued

| | Film structure | | | 2× speed | | | 4× speed | | | Change in | |
| --- | --- | --- | --- | --- | --- | --- | --- | --- | --- | --- | --- |
| Sample No. | Recording film | Interface layer | Heat sink layer | Erasing ratio | Jitter | Durability of reproduction | Erasing ratio | Jitter | Durability of reproduction | degree of modulation | Overall evaluation |
| Sample 18 | SbTeGeV | ZrO$_2$—Cr$_2$O$_3$ | None | o | x | o | o | x | o | o | x |
| Sample 19 | SbTeGeV | None | None | o | x | o | x | x | — | o | x |
| Sample 20 | GeBiTe | ZrO$_2$—Cr$_2$O$_3$ | None | o | o | o | x | x | — | x | x |
| Sample 21 | GeBiTe | None | None | x | x | — | x | x | — | x | x |

A sample with an erasing ratio of 25 dB or more was evaluated as "good" (represented by a circle "o"), and a sample with an erasing ratio of less than 25 dB was evaluated as "poor" (represented by a cross "x"). A sample with a jitter value of 8.5% or less was evaluated as "good" ("o"), and a sample with a jitter value of greater than 8.5% was evaluated as "poor" ("x"). A sample with a degree of durability of reproduction of less than 1% was evaluated as "good" ("o"), and a sample with a degree of durability of reproduction of 1% or more was evaluated as "poor" ("x"). A sample with a change in the degree of modulation of 5% or less was evaluated as "good" ("o"), and a sample with a change in the degree of modulation of more than 5% was evaluated as "poor" ("x"). When the evaluation could not be made, a dash "-" was placed in the corresponding column. An overall evaluation of a sample was made as follows. When all the evaluation results including the erasing ratio, jitter value, and degree of durability of reproduction at each of 2× speed recording and 4× speed recording and the change in the degree of modulation were "good," the sample was evaluated as "good" ("o"). If any of the evaluation results was "poor," the sample was evaluated as "poor" ("x").

In sample 19, the recording film containing V was used, but the interface layer and the heat sink layer were not provided. As can be seen from Table 6, in sample 19, the evaluation result of the durability of reproduction at 2× speed was good, but the evaluation result of the jitter value at 2× speed was poor. In addition, the evaluation results of the erasing ratio and the jitter value at 4× speed were not satisfactory. Therefore, good high-speed rewriting characteristics (erasing characteristics) and good reproduction stability could not be achieved at the same time.

In sample 17 in which the interface layer was not provided, the evaluation result of the erasing ratio at 4× speed was poor ("x"). In sample 18 in which the heat sink layer was not provided, the evaluation result of the jitter value at 4× speed was poor ("x"). In sample 13 in which the recording film material not containing V was used, the evaluation result of the durability of reproduction was poor ("x").

In sample 20 in which the recording film of GeBiTe (a compound-based phase-change recording film material) was used, the evaluation results at 2× speed were good, but the evaluation result of the erasing ratio at 4× speed was not satisfactory. Therefore, the disc of sample 20 cannot be adequate for high-speed rewriting. In sample 21 in which the interface layer was not provided, the crystallization speed was reduced significantly, and the erasing ratio at 2× speed was not satisfactory, so that rewriting could not be performed. It is evident from the above results that, when the compound-based material is used as the phase-change recording film of the semi-transparent information layer, high-speed recording at 4× speed or higher cannot be performed even though the interface layer is added. In these samples 20 and 21 in which the recording film material not containing Sb was used, the change in the degree of modulation was excessively large.

Accordingly, it is apparent that, in order to simultaneously achieve both good reproduction stability and good high-speed rewriting characteristics at 2× speed to 4× speed, the semi-transparent information layer of a multi-layer recording medium must include: a recording film formed of a material containing Sb as a main component and further containing V or V and In; an interface layer containing at least ZrO$_2$ and Cr$_2$O$_3$; and a heat sink layer formed of AlN or SiN.

Figure 8:
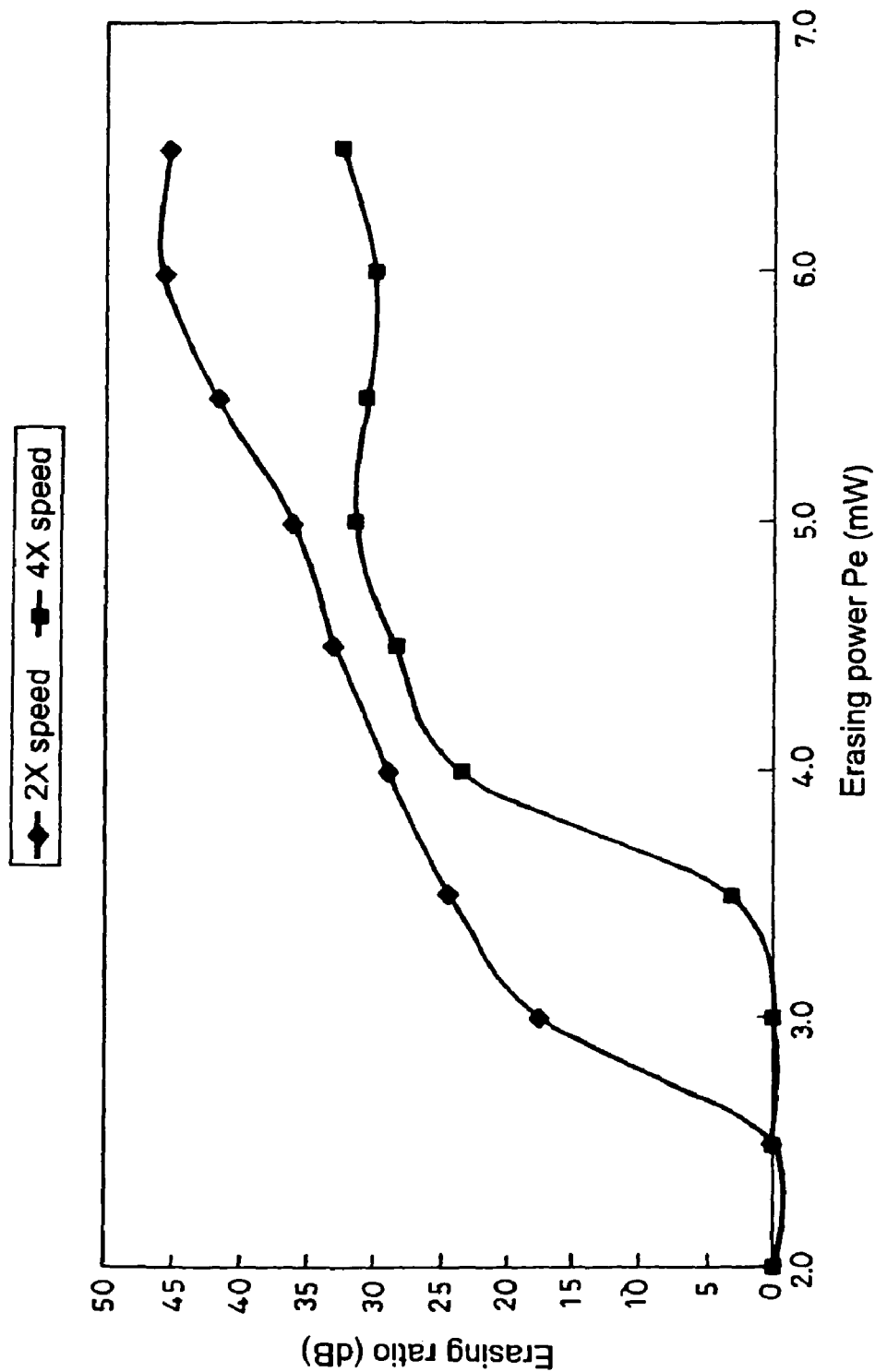
FIG. 8 is a graph showing the relationship between the erasing power and the erasing ratio in an optical recording medium according to the second exemplary embodiment of the present invention.
Figure 9:
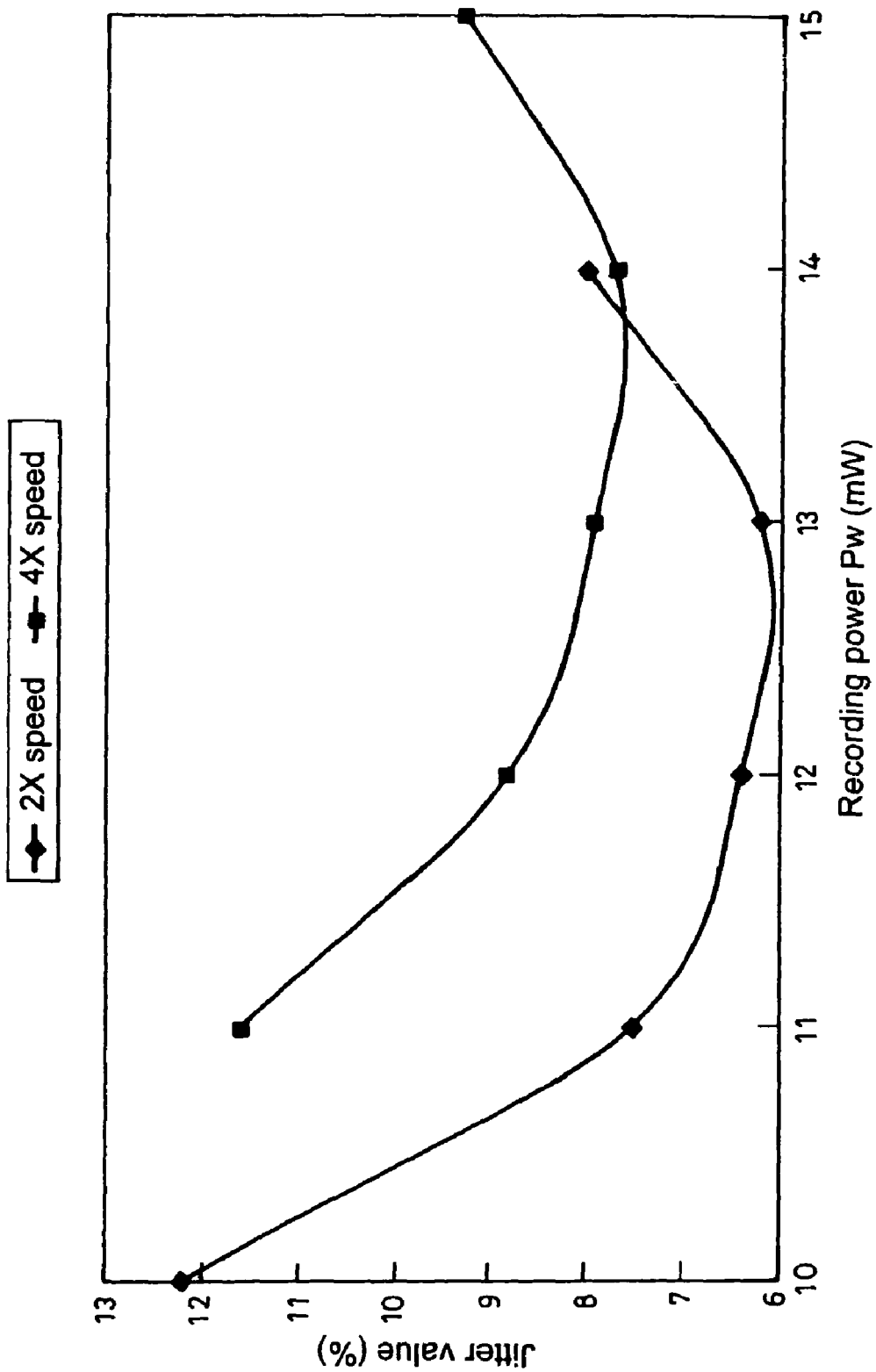
FIG. 9 is a graph showing the relationship between the recording power and the jitter value in the optical recording medium according to the second exemplary embodiment of the present invention.

Next, the margin for the erasing ratio of sample 15 at 2× speed recording and 4× speed recording are shown in Table 7 and FIG. 8, and the margin for the recording power is shown in Table 8 and FIG. 9. The margin for the erasing ratio was determined as follows. After a single 8T signal was recorded, DC erasing was performed one time at a linear velocity of 2× speed or 4× speed while the erasing power Pe was changed, and the erasing ratio at this time was measured.

TABLE 7

| | Erasing power | | | | | | | | | |
| --- | --- | --- | --- | --- | --- | --- | --- | --- | --- | --- |
| Recording speed | 2.0 | 2.5 | 3.0 | 3.5 | 4.0 | 4.5 | 5.0 | 5.5 | 6.0 | 6.5 |
| 2× speed | 0.0 | 0.2 | 17.6 | 24.5 | 29.0 | 33.2 | 36.2 | 41.7 | 45.9 | 45.4 |
| 4× speed | 0.0 | 0.0 | 0.0 | 3.3 | 23.4 | 28.4 | 31.6 | 30.7 | 30.2 | 32.7 |

The margin for the recording power was determined at a ratio Pe/Pw=0.33 for 2× speed recording and at Pe/Pw=0.40 for 4× speed recording, where Pw is the recording power, and Pe is the erasing power.

TABLE 8

| | Recording speed | |
| --- | --- | --- |
| Recording power | 2X speed | 4X speed |
| 10.0 | 12.2 | — |
| 11.0 | 7.5 | 11.6 |
| 12.0 | 6.4 | 8.8 |
| 13.0 | 6.2 | 7.9 |
| 14.0 | 8 | 7.7 |
| 15.0 | — | 9.3 |

As can be seen from Table 7 and FIG. 8, in sample 15, the erasing ratio at 2× speed and 4× speed (faster than 2× speed) can be equal to or higher than 25 dB that is an estimated erasing ratio for allowing repeated rewriting. As can be seen from Table 8 and FIG. 9, in sample 15, the jitter value at both 2× speed and 4× speed can be less than 8.5% that is an estimated practically acceptable level. Therefore, sample 15 has a good margin for the recording power. In Table 8, a dash "-" represents that the jitter value for the corresponding combination of the recording power and the recording speed was not measured.

Next, samples 22 to 26 were produced which had the same structure as that of sample 15 except that the thickness of the reflection layer was changed. For each of samples 22 to 26, the jitter value at 4× speed recording and the transmittance of the crystalline portion were measured. The transmittance was measured at a wavelength of 405 nm using a spectrophotometer. The results are shown in Table 9.

TABLE 9

| Sample No. | Thickness | Jitter value at 4X speed | Transmittance | Overall evaluation |
| --- | --- | --- | --- | --- |
| Sample 22 | 4 nm | x | o | x |
| Sample 23 | 8 nm | o | o | o |
| Sample 24 | 12 nm | o | o | o |
| Sample 25 | 16 nm | o | o | o |
| Sample 26 | 20 nm | o | x | x |

In Table 9, a sample with a jitter value of 8.5% or more was evaluated as "good" ("o"), and a sample with a jitter value at 4× speed of less than 8.5% was evaluated as "poor" ("x"). In addition, a sample with a transmittance of the crystalline portion of 40% or more was evaluated as "good" ("o"), and a sample with a transmittance of less than 40% was evaluated as "poor" ("x"). An overall evaluation of a sample was made as follows. When both the evaluation results of the jitter value at 4× speed and the transmittance of the crystalline portion were "good," the sample was evaluated as "good" ("o"). If any of the evaluation results was "poor," the sample was evaluated as "poor" ("x").

As can be seen from Table 9, in sample 22 in which the reflection layer has a small thickness (4 nm), the jitter value deteriorated since the heat dissipation effect is low. In sample 26 in which the reflection film has a large thickness (20 nm), the transmittance was reduced, and therefore the recording characteristics of the information layer located farthest away from the light incident surface deteriorated. Therefore, a preferred range of the thickness of the reflection layer is 8 nm or more to 16 nm or less.

Next, samples 27 to 31 were produced which had the same structure as that of sample 15 except that the thickness of the interface layer was changed. For each of samples 27 to 31, the erasing ratio at 4× speed was measured. The results are shown in Table 10.

TABLE 10

| Sample No. | Thickness | Erasing ratio at 4X speed | Overall evaluation |
| --- | --- | --- | --- |
| Sample 27 | 0 nm | x | x |
| Sample 28 | 1 nm | x | x |
| Sample 29 | 2 nm | o | o |
| Sample 30 | 5 nm | o | o |
| Sample 31 | 10 nm | o | o |

In Table 10, a sample with an erasing ratio at 4× speed of 25 dB or more was evaluated as "good" ("o"), and a sample with an erasing ratio at 4× speed of less than 25 dB was evaluated as "poor" ("x"). An overall evaluation of a sample was made as follows. When the evaluation result of the erasing ratio at 4× speed was "good," the sample was evaluated as "good" ("o"). When the evaluation result of the erasing ratio at 4× speed was "poor," the sample was evaluated as "poor" ("x").

As can be seen from Table 10, in sample 27 having no interface layer, and in sample 28 in which the interface layer has a small thickness (1 nm), the crystallization speed was reduced, and therefore the erasing ratio at 4× speed was reduced. In addition, when the thickness of the interface layer was 10 nm or more, the erasing ratio was not changed. Therefore, a thickness of 10 nm is sufficient when the effect of improving the crystallization speed is taken into consideration. Accordingly, the preferred thickness of the interface layer is 2 nm or more and 10 nm or less.

Next, samples 32 to 35 were produced which had the same structure as that of sample 15 except that the compositional ratio of $ZrO_2$—$Cr_2O_3$ of the interface layer was changed. For each of samples 32 to 35, the erasing ratio at 4× speed was measured. The results are shown in Table 11.

TABLE 11

| Sample No. | $ZrO_2$:$Cr_2O_3$ | Erasing ratio at 4X speed | Overall evaluation |
| --- | --- | --- | --- |
| Sample 32 | 100:0 mol % | x | x |
| Sample 33 | 90:10 mol % | o | o |
| Sample 34 | 20:80 mol % | o | o |
| Sample 35 | 0:100 mol % | Large number of film defects | x |

In Table 11, a sample with an erasing ratio at 4× speed of 25 dB or more was evaluated as "good" ("o"), and a sample with an erasing ratio at 4× speed of less than 25 dB was evaluated as "poor" ("x").

In sample 32 having the $ZrO_2$ interface layer not containing $Cr_2O_3$, the crystallization speed was reduced, and therefore the erasing ratio at 4× speed was reduced. In sample 35 having the $Cr_2O_3$ interface layer not containing $ZrO_2$, since a large number of defects were formed in the $Cr_2O_3$ film, the $Cr_2O_3$ film could not be used as the interface layer. Therefore, "large number of film defects" was placed in the "erasing ratio at 4× speed" column of Table 11. An overall evaluation of a sample was made as follows. When the evaluation result of the erasing ratio at 4× speed was "good," the sample was evaluated as "good" ("o"). When the evaluation result of the erasing ratio at 4× speed was "poor," the sample was evaluated as "poor" ("x").

As can be seen from the above results, preferably, the interface layer contains at least $ZrO_2$ and $Cr_2O_3$. The preferred amount of $ZrO_2$ is 20 mol % or more and 90 mol % or less, and the preferred amount of $Cr_2O_3$ is 10 mol % or more and 80 mol % or less.

Next, for samples 5, 6, 7, 8, and 36, the linear velocity and the reproduction durability were measured, and the measurement results were compared with each other. The linear velocity was determined as follows. After a single 8T signal was recorded, DC erasing was performed one time while the linear velocity was changed, and the erasing ratio at this time was measured. Then, a maximum value of the linear velocity that gives an erasing ratio of 25 dB or more, which allows rewriting, was determined.

In order to perform rewriting at 4× speed, the erasing ratio must be 25 dB or more at a linear velocity equal to or greater than 19.68 m/s, which is the linear velocity for 4×speed. In order to evaluate the reproduction durability, reproduction was repeated 10,000 times at a reproduction power of 1.3 mW and a linear velocity of 2× speed, and the amount of change in jitter value was determined. The results are shown in Table 12 and FIG. 10.

TABLE 12

| Sample No. | Amount of V | Linear velocity | Evaluation | Reproduction durability | Overall evaluation |
|---|---|---|---|---|---|
| Sample 5 | 0 at % | 22 m/s | o | x | x |
| Sample 6 | 2.6 at % | 25 m/s | o | o | o |
| Sample 7 | 5.3 at % | 26 m/s | o | o | o |
| Sample 8 | 7.9 at % | 22 m/s | o | o | o |
| Sample 36 | 10.6 at % | 18 m/s | x | o | x |

In Table 12, a sample with a linear velocity of 19.68 m/s or more, which allows erasing at 4x speed, was evaluated as "good" ("o"), and a sample with linear velocity of less than 19.68 m/s was evaluated as "poor" ("x"). In addition, when the amount of change in jitter value of a sample was less than 1%, the reproduction durability of the sample was evaluated as "good" ("o"). When the amount of change in jitter value was 1% or more, the reproduction durability was evaluated as "poor" ("x"). An overall evaluation of a sample was made as follows. When the evaluation results of both the linear velocity and the reproduction durability were "good," the sample was evaluated as "good" ("o"). If any of the evaluation results was "poor," the sample was evaluated as "poor" ("x").

Figure 10:
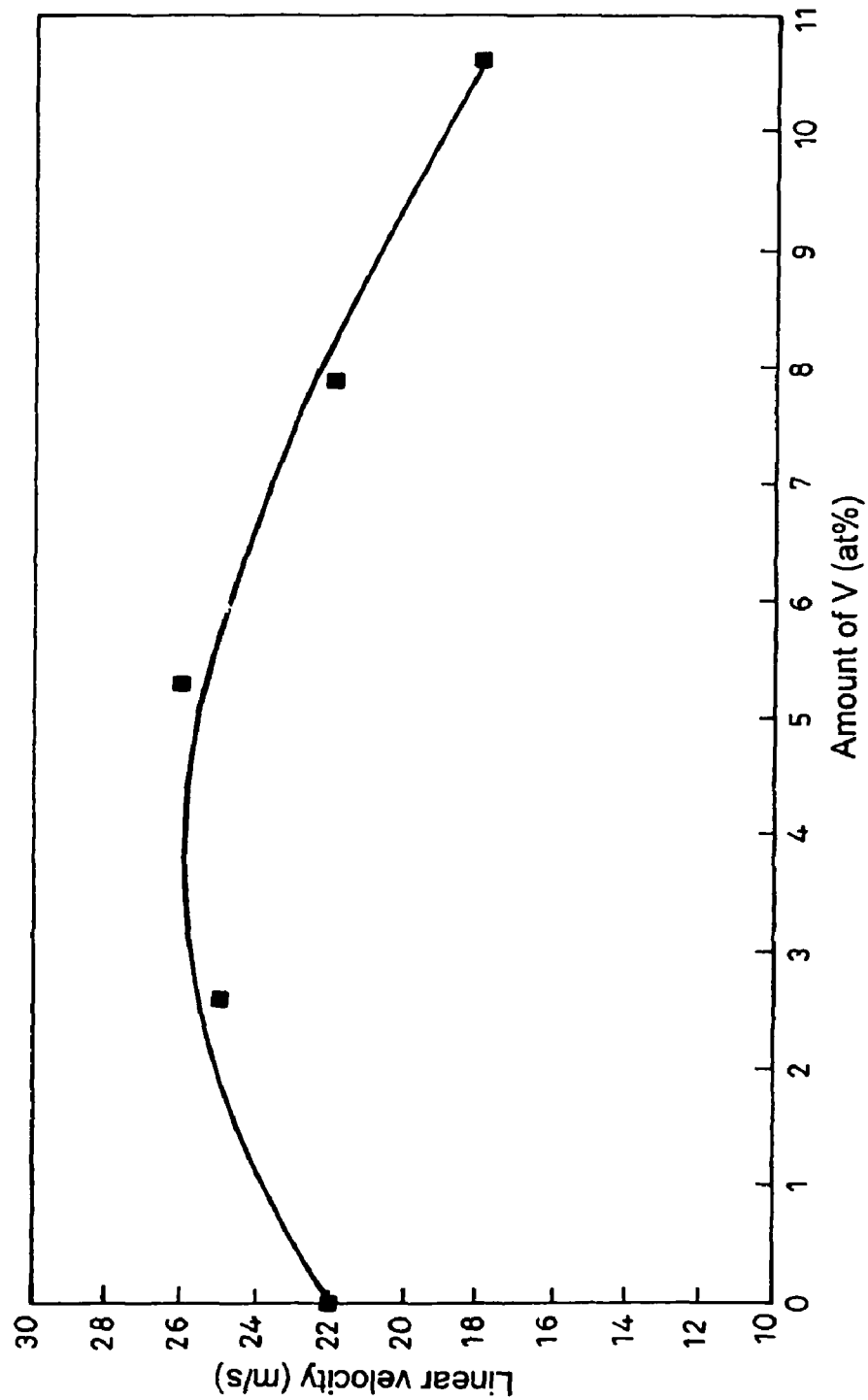
FIG. 10 is a graph showing the linear velocity and the reproduction durability of optical recording media of the first and second exemplary embodiments of the present invention.

As can be seen from Table 12 and FIG. 10, in sample 5 in which the amount of V is small, the durability of reproduction was significant, as described also in the first exemplary embodiment. However, if the amount of V is at least 2.6 at % as in sample 6, the above problem can be avoided. In addition, when the amount of V exceeds 10 at % (for example, when the amount of V is 10.6 at % as in sample 36), the linear velocity is reduced, and difficulty arises in rewriting at 4x speed.

As can be seen from the above results and also from FIG. 10, the preferred compositional range of V which can simultaneously provide both good repeated rewriting characteristics at 4x speed and good reproduction durability is 2 at % or more and 9 at % or less.

As described in the first and second exemplary embodiments and the comparative examples, it has been found that, when the recording film provided in the semi-transparent information layer of a rewritable phase-change optical recording medium contains Sb as a main component and further contains V or V and In as secondary components, crystallization of an amorphous mark caused by repeated irradiation with a laser beam occurs only in the central portion in the width direction of the amorphous mark. Note that the width direction is orthogonal to the scanning direction of the laser beam. Accordingly, with the recording film configured as above, the degree of modulation is prevented from decreasing below a certain value in the reproduction durability test.

The amorphous mark shown in FIG. 4 is composed of the pair of narrow strip-shaped marks $M_1A$ and $M_1B$ parallel to the scanning direction of the laser beam. However, the amorphous mark may be composed of a single narrow strip-shaped mark in place of the pair of narrow strip-shaped marks. For example, the single narrow strip-shaped mark may be formed by, after an amorphous mark is formed, applying thereto a laser beam having an erasing power and slightly shifted in the width direction of the amorphous mark that is orthogonal to the scanning direction of the laser beam. Alternatively, the single narrow strip-shaped mark may be formed by forming a pair of parallel narrow strip-shaped amorphous marks similar to those describe above and then applying a laser beam having an erasing power to only one of the formed amorphous marks so that the other amorphous mark remains unerased.

Although the present invention relates to rewritable phase-change optical recording media, information such as recording conditions may be recorded in the media in advance.

Moreover, although the above exemplary embodiments relate to rewritable phase-change optical recording media having two information layers, the present invention is not limited thereto. The invention is applicable to rewritable phase-change optical recording media having three or more information layers.

What is claimed is:

1. A rewritable phase-change optical recording medium, comprising: a substrate; a first information layer that is provided on a laser beam incident side of the substrate; and at least one semi-transparent information layer that is provided on the laser beam incident side of the substrate and is located farther away from the substrate than is the first information layer;

wherein the semi-transparent information layer includes a recording film that exhibits a phase change between crystalline and amorphous states to provide rewritability, by using an optical system with $\lambda/NA \leq 500$ nm, where NA is a numerical aperture of an objective lens and $\lambda$ is a wavelength of a laser beam, and wherein the recording film has an amorphous mark formed therein, the amorphous mark after repeated reproduction including a pair of narrow strip-shaped marks and a widthwise intermediate portion formed between the pair of narrow strip-shaped marks, the pair of narrow strip-shaped marks extending parallel to a scanning direction of the laser beam, the widthwise intermediate portion being crystallized and being located in a central portion in a width direction of the amorphous mark, the width direction being orthogonal to the scanning direction of the laser beam.

2. The rewritable phase-change optical recording medium according to claim 1, wherein high frequency modulation is applied to the laser beam during reproduction under the conditions of a frequency of 350 MHz or more, a Ratio of more than 6, and a pulse width of 250 psec or more.

3. The rewritable phase-change optical recording medium according to claim 1, wherein the recording film contains Sb as a main component.

4. The rewritable phase-change optical recording medium according to claim 2, wherein the recording film contains Sb as a main component.

5. The rewritable phase-change optical recording medium according to claim 3, wherein the recording film further contains V or V and In as secondary components.

6. The rewritable phase-change optical recording medium according to claim 4, wherein the recording film further contains V or V and In as secondary components.

7. The rewritable phase-change optical recording medium according to claim 5, wherein an amount of V is 2 at % or more and 9 at % or less.

8. The rewritable phase-change optical recording medium according to claim 6, wherein an amount of V is 2 at % or more and 9 at % or less.

9. The rewritable phase-change optical recording medium according to claim 3, wherein the semi-transparent information layer includes a reflection film provided on a side opposite to the laser beam incident side of the recording film, the reflection film having a thickness of 8 nm or more and 16 nm or less.

10. The rewritable phase-change optical recording medium according to claim 4, wherein the semi-transparent information layer includes a reflection film provided on a side opposite to the laser beam incident side of the recording film, the reflection film having a thickness of 8 nm or more and 16 nm or less.

11. The rewritable phase-change optical recording medium according to claim 5, wherein the semi-transparent information layer includes a reflection film provided on a side opposite to the laser beam incident side of the recording film, the reflection film having a thickness of 8 nm or more and 16 nm or less.

12. The rewritable phase-change optical recording medium according to claim 6, wherein the semi-transparent information layer includes a reflection film provided on a side opposite to the laser beam incident side of the recording film, the reflection film having a thickness of 8 nm or more and 16 nm or less.

13. The rewritable phase-change optical recording medium according to claim 1, wherein the semi-transparent information layer includes an interface layer in contact with the laser beam incident side of the recording film, the interface layer containing at least Cr and O.

14. The rewritable phase-change optical recording medium according to claim 1, wherein the semi-transparent information layer includes a heat sink layer, a dielectric layer, an interface layer, and the recording film in that order from the laser beam incident side, the heat sink layer being formed of one of AlN and SiN.

15. The rewritable phase-change optical recording medium according to claim 14, wherein the interface layer is formed of a $ZrO_2$—$Cr_2O_3$ film containing at least $ZrO_2$ and $Cr_2O_3$, the $ZrO_2$—$Cr_2O_3$ film having a thickness of 2 nm or more and 10 nm or less.

16. The rewritable phase-change optical recording medium according to claim 15, wherein the $ZrO_2$—$Cr_2O_3$ film contains $ZrO_2$ in an amount of 20 mol % or more and 90 mol % or less and $Cr_2O_3$ in an amount of 10 mol % or more and 80 mol % or less.

17. The rewritable phase-change optical recording medium according to claim 15, wherein the $ZrO_2$ is stabilized $ZrO_2$ containing $Y_2O_3$, the stabilized $ZrO_2$ having a compositional ratio of $ZrO_2:Y_2O_3=(100-x):x$ (mol %) with $2 \leq X \leq 10$.

18. The rewritable phase-change optical recording medium according to claim 16, wherein the $ZrO_2$ is stabilized $ZrO_2$ containing $Y_2O_3$, the stabilized $ZrO_2$ having a compositional ratio of $ZrO_2:Y_2O_3=(100-x):x$ (mol %) with $2 \leq x \leq 10$.

* * * * *